(12) United States Patent
Logsdon (10) Patent No.: US 10,743,477 B2
(45) Date of Patent: Aug. 18, 2020

(54) IRRIGATION SYSTEM FOR HANGING PLANTS AND METHOD OF IRRIGATING HANGING PLANTS

(71) Applicant: Control Dekk, Wyoming, MI (US)

(72) Inventor: Leonard Logsdon, Wyoming, MI (US)

(73) Assignee: Control Dekk, Wyoming, MI (US)

( * ) Notice: Subject to any disclaimer, the term of this patent is extended or adjusted under 35 U.S.C. 154(b) by 0 days.

(21) Appl. No.: 15/368,789

(22) Filed: Dec. 5, 2016

(65) Prior Publication Data

US 2017/0142913 A1 May 25, 2017

Related U.S. Application Data

(63) Continuation of application No. 14/949,844, filed on Nov. 23, 2015, now Pat. No. 9,516,820.

(51) Int. Cl.
*A01G 9/24* (2006.01)
*A01G 27/00* (2006.01)
*A01G 9/02* (2018.01)
*G01G 19/52* (2006.01)

(52) U.S. Cl.
CPC ............. *A01G 9/247* (2013.01); *A01G 9/024* (2013.01); *A01G 27/003* (2013.01); *G01G 19/52* (2013.01)

(58) Field of Classification Search
CPC .......... A01G 9/00; A01G 9/022; A01G 9/247; A01G 9/26; A01G 25/16; A01G 25/162; A01G 25/165; A01G 27/003
See application file for complete search history.

(56) References Cited

U.S. PATENT DOCUMENTS

| 4,547,992 | A | * | 10/1985 | Wingerden | ............ | A01G 9/143 47/17 |
| 8,453,380 | B1 | * | 6/2013 | Helder | ................... | B65G 17/20 47/67 |
| 8,769,870 | B2 | * | 7/2014 | Schutter | ............... | A01G 25/167 47/67 |
| 2012/0260569 | A1 | * | 10/2012 | Golgotiu | .................. | A01G 7/00 47/65 |
| 2014/0076422 | A1 | * | 3/2014 | Anga | ................... | A01G 27/008 137/406 |
| 2015/0289460 | A1 | * | 10/2015 | Vanderveken | ....... | A01G 27/003 47/66.7 |

* cited by examiner

*Primary Examiner* — Lisa L Tsang
(74) *Attorney, Agent, or Firm* — The Watson IP Group, PLC; Jovan N. Jovanovic (57) ABSTRACT

An irrigation method for hanging plants in a hanging plant carousel system that includes a frame and a measuring assembly. The frame is fixedly coupled to a substantially stationary structure, such as the building or a portion of a truss system supporting the carousel system. The measuring assembly includes a movable arm, a sensor and a controller. The movable arm has a contact surface with a measuring start and end point, which extends into the path of the basket hook coupled to the cable of the carousel system. The movable arm is displaceable by at least one of the basket hook or a plant pot structure coupled thereto. The sensor coupled to the movable arm and is configured to provide data from which the weight of a plant pot structure can be determined. The controller is configured to control a watering system to provide water to the plant pot structure.

10 Claims, 12 Drawing Sheets

IRRIGATION SYSTEM FOR HANGING PLANTS AND METHOD OF IRRIGATING HANGING PLANTS

CROSS-REFERENCE TO RELATED APPLICATION

This application is a continuation of U.S. patent application Ser. No. 14/949,844 filed Nov. 23, 2015, entitled Irrigation System For Hanging Plants And Method Of Irrigating Hanging Plants, the entire specification of which is hereby incorporated by reference in its entirety.

BACKGROUND OF THE DISCLOSURE

1. Field of the Disclosure

The disclosure relates in general to irrigation systems, and more particularly, to an irrigation system for hanging plants that are on a rotating suspended cable system or the like. Typically, such systems are found in green house locations.

2. Background Art

Irrigation of hanging plants is challenging in a greenhouse environment. Typically, hanging plants are mounted on a hanging plant carousel system (which will be described below). The carousel system includes a watering system configured to dispense water into a plant pot structure hanging from the carousel as the carousel is rotated beyond the watering system.

It is often difficult to determine both whether or not to water the hanging plants, and, also to determine how much to water the hanging plants. In the simplest form, an operator may observe moisture levels by sampling soil within the plant pot structure to get a feel for the soil conditions. Once determined, the user makes assumptions relative to the condition of the other hanging plant pot structures. Finally, the user determines how much water to dispense into each hanging plant pot structure.

Amongst other problems, such a methodology assumes the condition of the other plants based on the one or more plants that have been inspected. Based on the position of the hanging plant within the greenhouse structure, the health of the plant, the soil composition, among other variables, the condition of the inspected plant or plants may bear little resemblance or information as to the particular condition of any other plant.

Additionally, as to how much to water, the user generally is guessing based upon the observation of the moisture levels within the pot. There are no real determinations as to weight or the like. And, even if the determination was precise on the plant that was inspected, there is no guarantee that the same amount of water was proper to administer to any of the other plants.

Certain systems have been developed to improve such watering. One such system is manufactured and sold under the trademark Rapid Water Logic. Such a system determines if a hanging plant pot structure that is on a moving carousel is above or below a certain threshold weight. If below, then the system triggers watering of the plant pot structure. Problematically, as the actual weight is not determined, the actual amount of water needed is not known. Rather, the same amount of water is provided regardless of how far below the threshold weight the particular plant pot structure may be. While an improvement, problems with consistency between plants and optimal utilization of resources remain.

SUMMARY OF THE DISCLOSURE

The disclosure is directed to an irrigation system for hanging plants in a hanging plant carousel system comprising a frame, and a measuring assembly. The frame is fixedly coupled to a substantially stationary structure, such as, for example, and without limitation, the building (i.e., greenhouse) structure, a truss, a support beam or the like. The measuring assembly comprises a movable arm, a sensor and a controller. The movable arm has a contact surface. The contact surface has a measuring start point and a measuring end point. At least a portion thereof extending into a path of a basket hook coupled to a cable of a hanging plant carousel system. The movable arm is displaceable by at least one of the basket hook or a plant pot structure coupled thereto. The sensor is coupled to the movable arm. The sensor is configured to provide data from which the weight of a plant pot structure can be determined. The controller is coupled to the sensor. The controller is configured to at least one of indirectly and directly control a watering system configured to provide water to the plant pot structure.

In some configurations, the movable arm further includes a first end and a second end. The movable arm is pivotable about a pivot axis positioned proximate the first end.

In some configurations, the measuring start point is spaced apart from the first end.

In some configurations, the contact surface between the measuring start point and the measuring end point is substantially planar and oblique to the cable of the hanging plant carousel system.

In some configurations, the contact surface between the first end and the measuring start point is substantially planar and oblique to the contact surface between the measuring start point and the measuring end point. This defines a peak at the measuring start point.

In some configurations, a log triggering sensor is positioned proximate the measuring start point. The log triggering sensor initiates the logging by the controller of data from the measuring sensor.

In some configurations, the measuring sensor comprises one of a load cell, a strain gauge, and an linear variable differential transformer.

In some configurations, the contact surface of the movable arm between the measuring start point and the measuring end point is substantially parallel to the cable of the hanging plant carousel system.

In some configurations, the path of the cable defines a plane, with at least a portion of the basket hook defining a plane that is generally perpendicular to the plane defined by the path of the cable. The contact surface is oblique to each of the plane defined by the path of the cable and the plane defined by the basket hook.

In another aspect of the disclosure, the disclosure is directed to a method of irrigating a hanging plant on a hanging plant carousel system comprising the steps of: directing one of a basket hook suspended from a cable of the hanging plant carousel system and a plant pot structure hanging therefrom into contact with a movable arm, the movable arm having a contact surface with measuring start point and a measuring end point; displacing the movable arm by the basket hook and the plant pot structure; measuring the displacement of the movable arm; computing the weight of the plant pot structure; determining a quantity of water that is necessary for the plant pot structure; and providing the quantity of water determined in the determining step.

In some configurations, the step of measuring the displacement of the movable arm further comprises the steps of: measuring the displacement of the movable arm at a predetermined rate between the measuring start point and the measuring end point.

In some configurations, the step of measuring the displacement utilizes one of a load cell, a strain gauge or an linear variable differential transformer.

In some configurations, the method includes the step of altering the speed of the cable at least one of prior to, during and after the step of providing the quantity of water.

In some configurations, the hanging plant carousel system further includes a plurality of spaced apart basket hooks with a plant pot structure hanging therefrom. The method further comprises the step of: repeating the steps of directing, displacing, measuring, computing, determining and providing sequentially for each of the plurality of plant pot structures hanging from the plurality of spaced apart basket hooks.

In some configurations, the plant pot structures further comprise one of a upper plant pot structure and a lower plant pot structure. The method further comprises the step of: determining whether each one of the plurality of plant pot structures comprise a upper plant pot structure or a lower plant pot structure. And further, the step of providing further comprises the steps of: providing the quantity of water determined in the determining step to a lower watering system if it is determined that the plant pot structure is a lower plant pot structure; and providing the quantity of water determined in the determining step to an upper watering system if it is determined that the plant pot structure is an upper plant pot structure.

BRIEF DESCRIPTION OF THE DRAWINGS

The disclosure will now be described with reference to the drawings wherein:

FIG. 12b of the drawings is a front elevational view of the irrigation system of the present disclosure, showing the basket hook in the position shown in FIG. 12a;

FIG. 13b of the drawings is a back elevational view of the irrigation system of the present disclosure, showing the basket hook in the position shown in FIG. 13a;

FIG. 14b of the drawings is a back elevational view of the irrigation system of the present disclosure, showing the basket hook in the position shown in FIG. 14a;

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
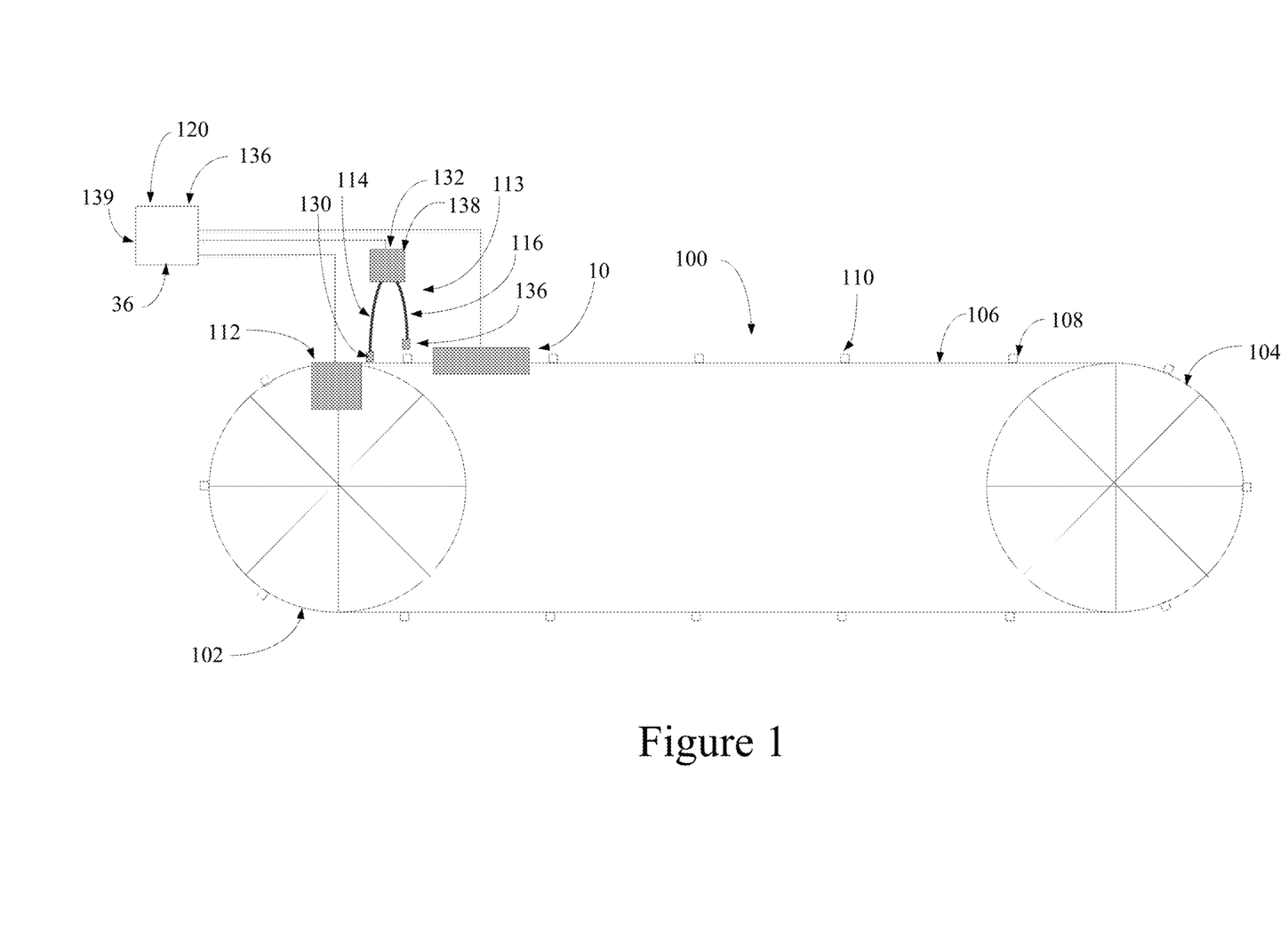
FIG. 1 of the drawings is a top plan view of a hanging plant carousel system having the irrigation system for hanging plants of the present disclosure.
Figure 2:
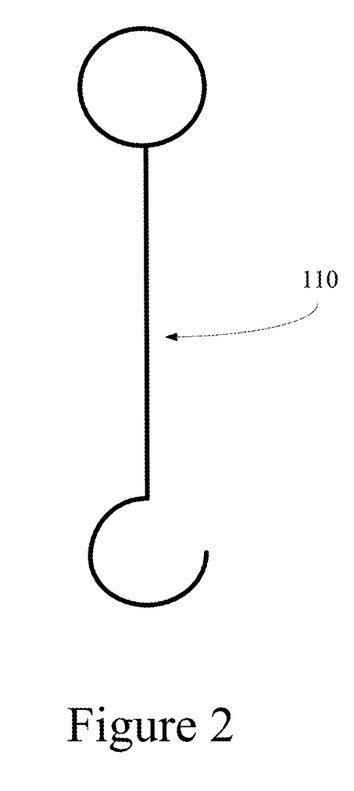
FIG. 2 of the drawings is a side elevational view of an adapter for lower hanging plants on a hanging plant carousel system.

Referring now to the drawings and in particular to FIG. 1, the irrigation system for hanging plants is shown generally at 10. The system is configured for use in association with hanging plants that are on a rotating suspended cable system, a chain system or the like. One such system is available from Cherry Creek Systems under the trademark Echo®. Of course, the irrigation system of the present disclosure is not limited to such use in association with the above system, and can be utilized with other systems, such as systems available from GTI and FormFlex, among others.

Figure 3:
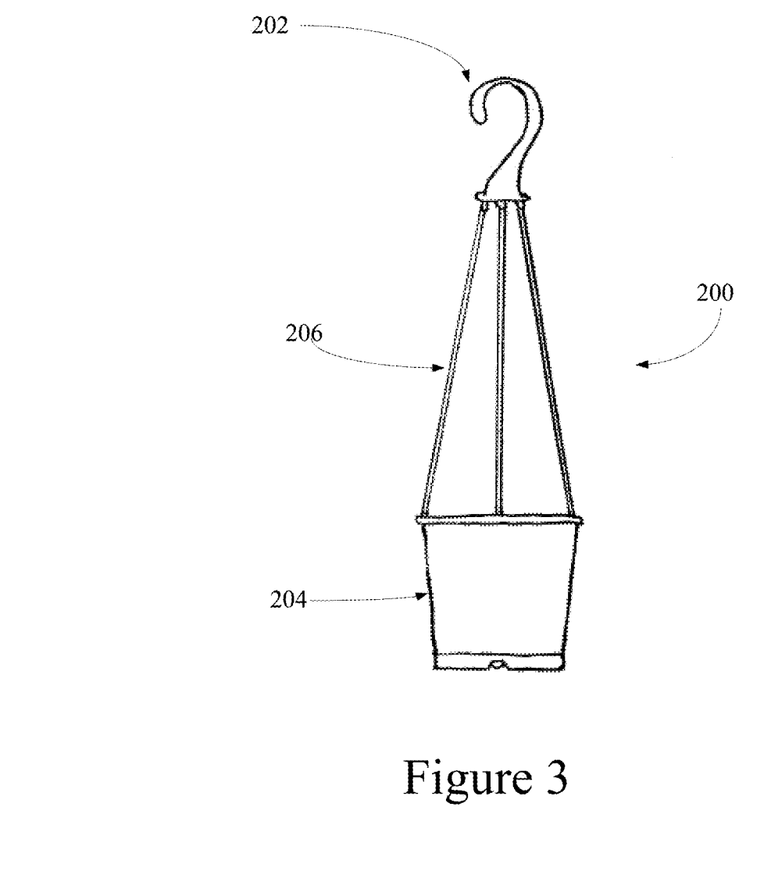
FIG. 3 of the drawings is a plant pot structure which is configured for use in association with the hanging plant carousel system.
Figure 4:
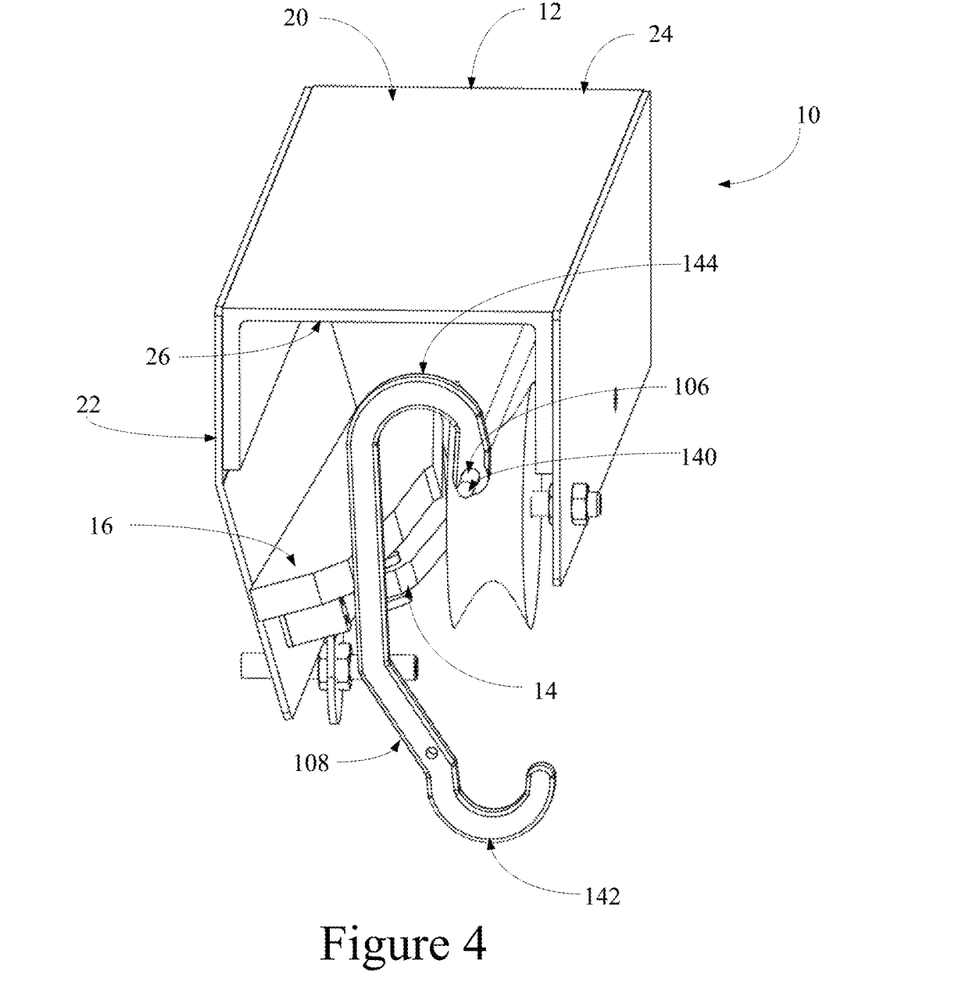
FIG. 4 of the drawings is a perspective view of the irrigation system for hanging plants, showing, in particular, the interaction with the basket hook of the hanging plant carousel system.
Figure 5:
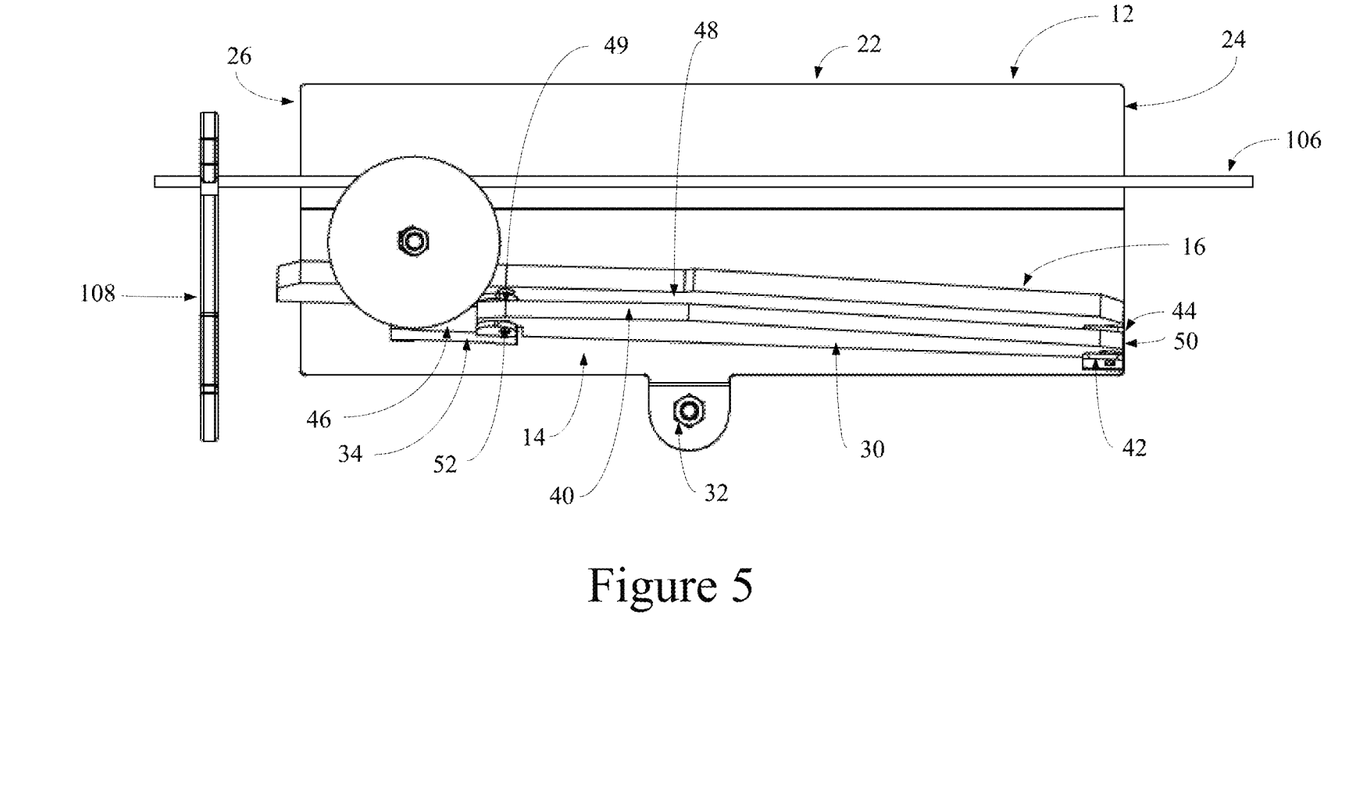
FIG. 5 of the drawings is a front elevational view of the irrigation system for hanging plants, with a portion of the housing removed for purposes of clarity, and disclosing a cable with a basket hook hanging therefrom, and a pulley for guiding purposes.
Figure 6:
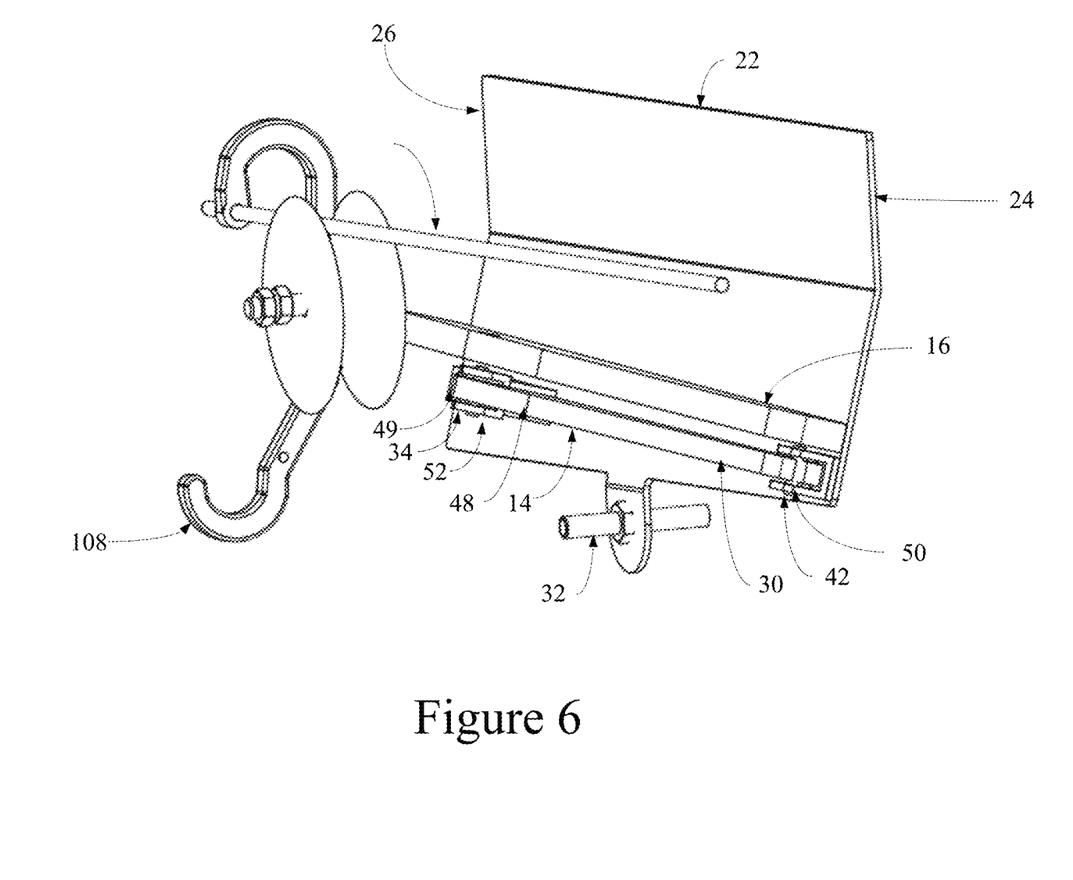
FIG. 6 of the drawings is a perspective view of the irrigation system for hanging plants, with a portion of the housing removed, and including a pulley, the cable and the basket hook.
Figure 7:
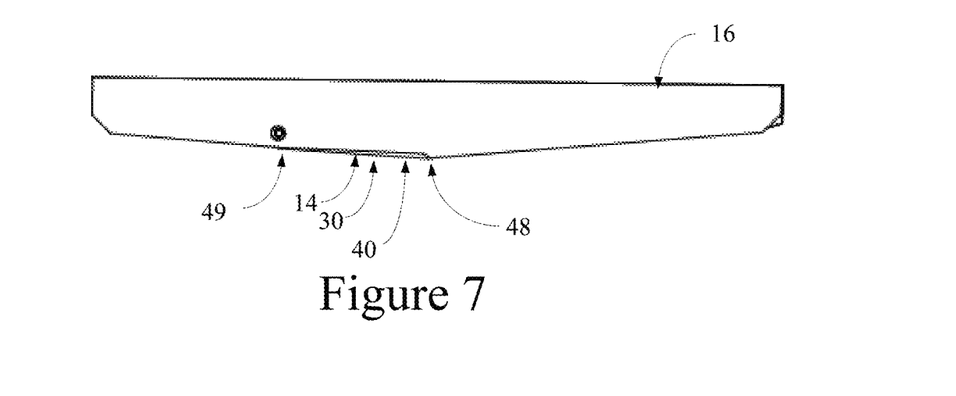
FIG. 7 of the drawings is a top plan view taken generally perpendicular to the surface of the path forming member, showing, the relationship between the path forming member and the movable arm, and showing the transition from the path forming member to the movable arm during the measuring between the measuring start point and the measuring end point.
Figure 8:
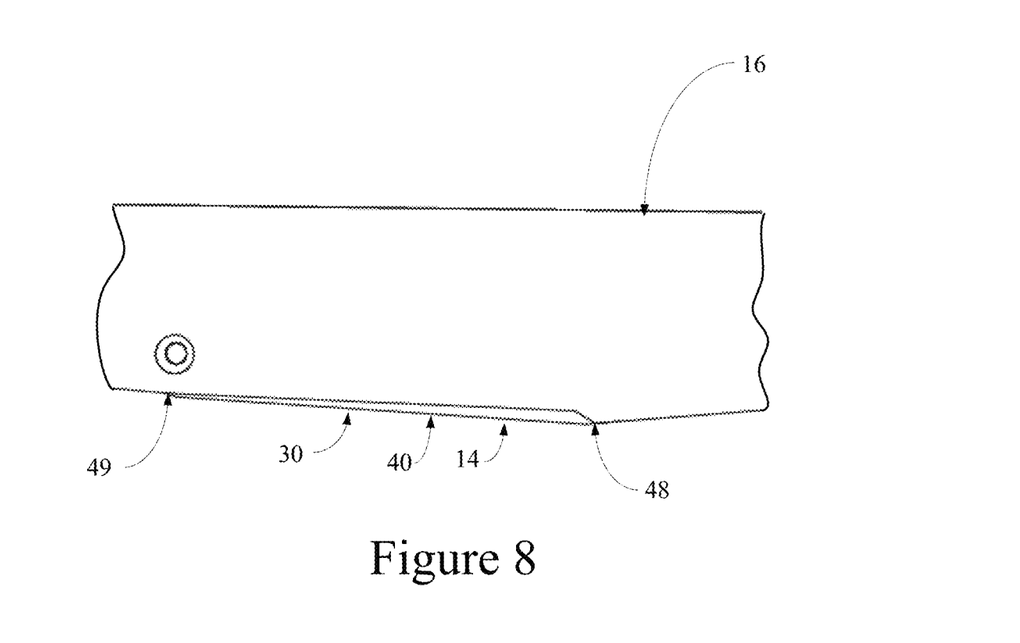
FIG. 8 of the drawings is a partial top plan view of the view shown in FIG. 7, more clearly showing the overlap between the path forming member and the movable arm through the measuring zone between the measuring start point and the measuring end point.
Figure 9:
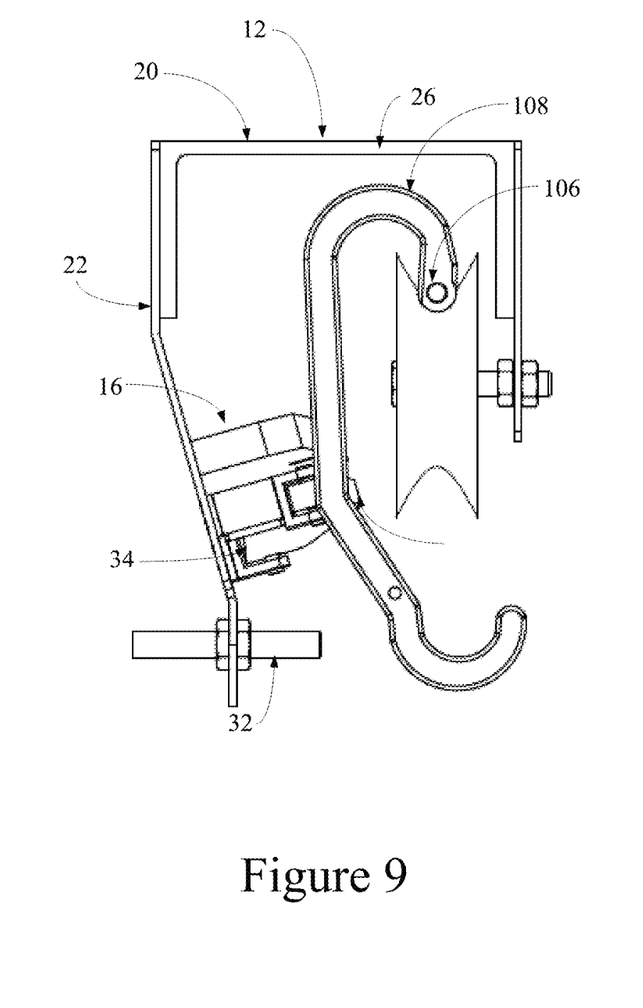
FIG. 9 of the drawings is a back elevational view taken at the second end of the housing.
Figure 10:
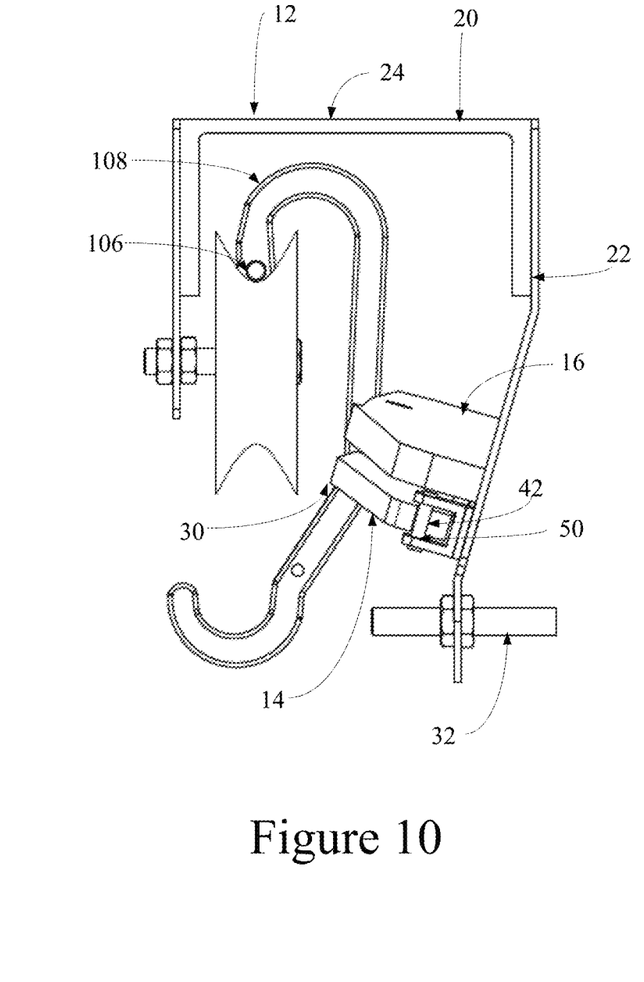
FIG. 10 of the drawings is a front elevational view taken at the first end of the housing.
Figure 11:
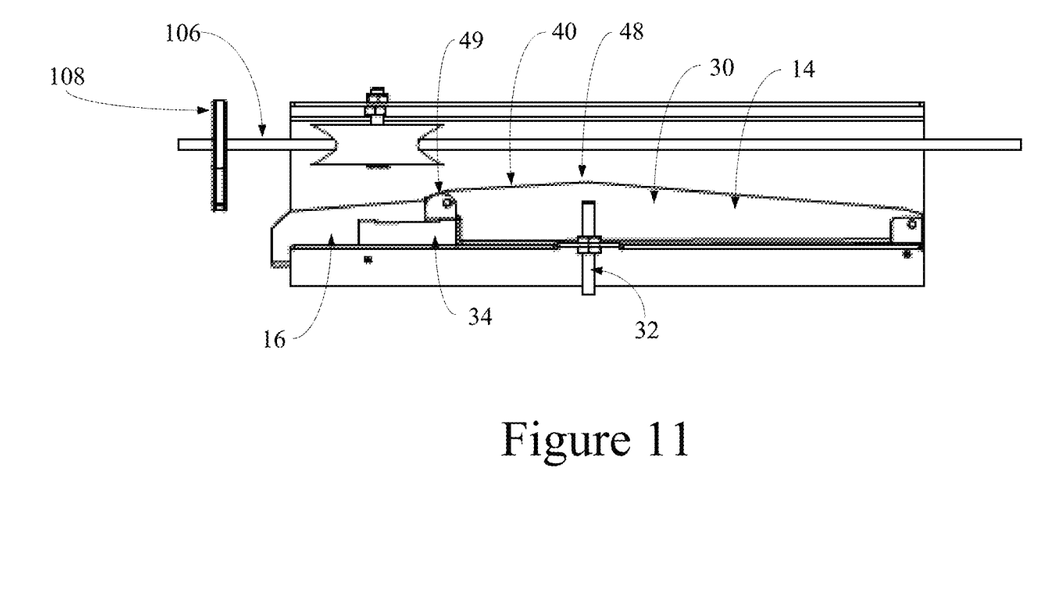
FIG. 11 of the drawings is a bottom plan view of the irrigation system of the present disclosure, together with a pulley, a cable and a basket hook with which the system is associated.

Generally, such installations and systems for which the irrigation system of the present disclosure is directed typically include a hanging plant carousel system 100 which is configured to store, move and retain a plurality of plant in plant pot structures 200 (FIG. 3). An exemplary hanging plant carousel system is shown as including first end drum 102 and second end drum 104. The two drums are positioned in the same plane, preferably and are spaced apart from each other. Typically, they are suspended from overhead beams and trusses of a building such as a greenhouse. A cable 106 is looped around the two drums and sufficiently taut so that when the drums rotate, the cable is rotated thereby. A plurality of pulleys or other guide structures are positioned along the desired route of the cable to support the same. At predetermined points along the cable, bracket hooks, such as hooks 108 are positioned. In many installations, the plants are maintained at two levels, a lower level and an upper level. While the bracket hooks 108 may be identical, a tab or other element that sticks out may identify that a lower or upper plant pot structure is attached thereto. In addition, in some configurations, an extension member is utilized for the lower level (wherein the bracket hooks are substantially identical).

In the configuration shown, the hook 108 typically includes a body cable attachment region 140 and hook portion receiving hook 142. It is preferably configured that the hook portion receiving hook 142 is positioned directly below the body cable attachment region 140 so that when weighted, rotational moments can be substantially eliminated and the plant pot structure will hang directly below the cable. A portion of the basket hook 108 extends upwardly and away from the body cable attachment region 140 so as to allow clearance and so as not to interfere with any pulleys or supports along the cable route, and also not to interfere with the operation of the first and second end drums.

A motor, such as motor 112 is coupled, typically to the first or second end drum to rotate the drum, and in turn, rotate the cable and bracket hooks therearound. A controller, such as controller 120 may be employed so as to provide control to the motor. In various embodiments, such a controller can control whether or not the motor is energized, as well as the rate or revolution of the motor. In turn, such control can control the linear speed of the cable. Different controllers can include differing amounts of variability. Whereas some controller can control only whether the motor is on or off and when it is on, the motor revolves at a predetermined speed, in other configurations, the controller can control the actual speed of the motor and can vary the motor within certain minimum and maximum speed.

A watering system 113 provides water to the upper and lower hanging plant pot structures. In the configuration shown, an upper watering system 114 and a lower watering system 116 is present. The upper watering system includes nozzle 130 which is configured to provide water to an upper plant pot structure when moved into position, and a valve 132 that can selectively allow the passage of water therethrough and to the nozzle. The lower watering system includes nozzle 136, and valve 138 associated therewith. A controller, such as controller 134 can control when each of the valves of the upper and lower watering systems are opened, and for how long they remain open. The controller 120 and 134 may be, and often form components of an overall controller so that the two are synchronized, that is, the speed of the line and the opening of a respective nozzle may be associated with each other.

Typically, and with reference to FIG. 3, the plant pot structure 200 includes a hook portion 202, a basket portion 204 and a plurality of connector member 206 extending therebetween. The hook portion 202 often comprises curved member that extends about the basket hook 108 in operable engagement. It will be understood that generally the two hooks are generally perpendicular to each other in operable engagement. The basket portion 204 generally includes openings to allow for the draining of excess water and the like from within the basket portion. Typically the basket portion is filled with dirt or the like, and a plant or seed. The connector members 206 may be integrally molded with the hook portion (or with the basket portion), or may comprise separate members that are coupled to each of the basket portion and the hook portion. In different configurations, the number and position of the connector members can be varied without departing from the scope of the present disclosure. It is contemplated that variations may exist between the plant pot structures positioned in the upper and the lower positions, and that variations may be present from plant to plant. The disclosure is not limited to any particular type of plant, as well as to any particular type or brand of plant pot structure.

Referring now to FIGS. 4 through 14b, the irrigation system 10 includes frame 12, measuring assembly 14 and path forming members 16. The frame 12, as is shown in greater detail in FIG. 4, includes truss attachment portion 20, measuring attachment portion 22. In the configuration shown, the frame 12 comprises a structure with a substantially horizontal panel and an oblique panel. The horizontal panel comprises the truss attachment portion, and the oblique panel comprises the measuring attachment portion. In the configuration shown, the two components are made from a single piece of substantially uniform stainless steel member. In other configurations, other materials are contemplated, and additional bracing is contemplated. The frame provides a member which is coupled to the truss system or to the building and which is typically rigid so as to provide a solid structure upon which to mount the measuring assembly. Generally, the frame is defined by first end 24 and second end 26.

The frame is positioned such that the measuring assembly can be coupled thereto and so that portions of the measuring assembly can interface with the hanging plant carousel system components. Such interaction will be described hereinbelow.

With reference to FIGS. 4 through 14b, the measuring assembly 14 comprises movable arm 30, log trigger sensor 32, measuring sensor 34 and controller 36. The movable arm 30 is movably coupled to the frame so as to permit some relative movement therebetween. In the configuration shown, the movable arm 30 includes contact surface 40 and frame attachment mechanism 42, as well as first end 44 and second end 46. Additionally, the contact surface 40 defines measuring start point 48 and measuring end point 49. In some configurations, the first end 44 will correspond to the measuring start point 48 and the second end 46 will correspond to the measuring end point 49. In other configurations, one or both of the foregoing will not be corresponding. In the configuration shown, the measuring points 48 and 49 comprise a relatively short portion of the overall contact surface, and much of the contact surface may be incidentally contacted, or not contacted at all by the bracket hooks.

In the configuration shown, a portion of the contact surface corresponding from the first end 44 to the measuring start point 48 is angled away from the measuring attachment portion 22 and toward the cable 106 and basket hook 108 of the hanging plant carousel system. The portion of the contact surface from the measuring start point 48 to the measuring end point 49 which corresponds to the second end 46 is angled in the opposite direction, or away from the components of the hanging plant carousel system. As will be explained below, the configuration of the measuring portion (defined by the surface between the measuring start point 48 and the measuring end point 49) is such that the moment arm of the rotation of the movable arm remains substantially constant. It will further be understood that in some configurations, the path of the cable defines a plane (and the plane is generally defined by the first end drum 102 and the second end drum 104). With the configuration of the basket hook, the basket hook defines a plane that is generally perpendicular to the plane defined by the path of the cable. The contact surface of the movable arm, is oblique to each of the plane defined by the path of the cable and the plane defined by the basket hook. In such a manner, the hook has full surface contact with the movable arm, which minimizes erratic readings due to rocking, sticking or dragging of the basket hook along the contact surface.

The frame attachment mechanism 42 in the configuration shown comprises pivot axis 50 and slidable engagement member 52. The pivot axis 50 provides an axis by which the movable arm can rotate. The pivot axis is positioned proximate the first end of the contact surface. The slidable engagement member 52 is distally placed therefrom so as to provide a coupling for the measuring sensor to have a point of coupling or sensing. The slidable engagement member 52 is positioned proximate the second end 46 (and in the configuration shown, spaced apart from the second end a predetermined distance).

The log trigger sensor 32 is positioned proximate the measuring starting point 48, and in the configuration shown comprises a sensor that can sense the passage of a hook thereacross. In other configurations, other types of sensors, such as mechanically actuated sensors, among others may be utilized. Such a sensor is triggered upon the hook traversing the measuring start point 48. Additionally, the duration of the trigger can provide information as to the type of hook portion 202 coupled thereto (i.e., whether a hook portion 202 is coupled indicative of an upper hanging plant, versus an adapter 110, which may be of a different shape, indicative of a lower hanging plant). In some configurations the log trigger sensor can function to initiate the sampling from the measuring sensor, whereas in other configurations, the log trigger sensor is utilized only to determine whether a upper or lowers plant is entering the measuring system.

The measuring sensor 34 is positioned to cooperatively engage the frame 12 (or a component fixedly coupled to the frame or other reference surface that is substantially if not completely fixed) and the slidable engagement member 52. The measuring sensor may comprise a load cell, a strain gauge, a displacement sensor, or the like. In the configuration shown, the measuring sensor comprises a load cell. A controller 36 is coupled to the log trigger sensor and to the measuring sensor so as to obtain readings from the load cell at predetermined intervals while the force from the hook is pressing upon the contact surface between the measuring start point and the measuring end point. In the configuration shown, the controller samples at 100 miliseconds, or, 10 Hz. Of course, depending on the particular configuration, the sampling rate can be varied without departing from the scope of the disclosure. As will be explained below, based on the data obtained from the sensor, the controller can compute the weight of the plant pot structure 200 (or any component thereof, such as the plant and soil, for example). It will be understood that the controller 36 can be coupled to the controller(s) of the hanging plant carousel system so as to control the speed of travel of the cable, as well as the operation of the valves of the upper and lower watering systems 114, 116.

The path forming member 16, in the embodiment shown, comprises a member that extends the length of the device. The member is angled to direct the basket hook to the movable arm, and then to support the basket hook after passing beyond the end of the movable arm. The movable arm is positioned below and generally parallel to the path forming member, and extends beyond the path forming member at for the measuring start point 48 to the measuring end point 49. Thus, the path forming member leads the hanging basket to the movable arm and then away from the movable arm after passing through the measuring region bounded by the measuring start and end points. In the configuration shown, the path forming member continues to return the basket hook to the initial hanging position smoothly, while minimizing the disruption to the plant positioned within the plant pot structure (that is, to minimize the swaying and jolting thereagainst). Indeed, the path forming member guides the basket hook through the entire assembly, transferring the basket hook to the measuring arm for the measurement, before reaccepting the basket hook to guide it out of the irrigation system.

Figure 15:
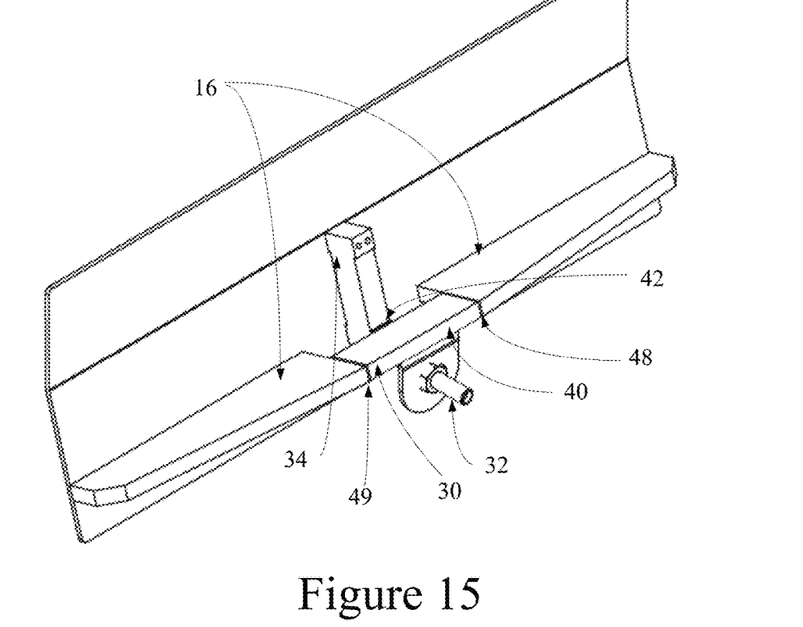
FIG. 15 of the drawings is a perspective view of an alternate embodiment of the irrigation system of the present disclosure.
Figure 16:
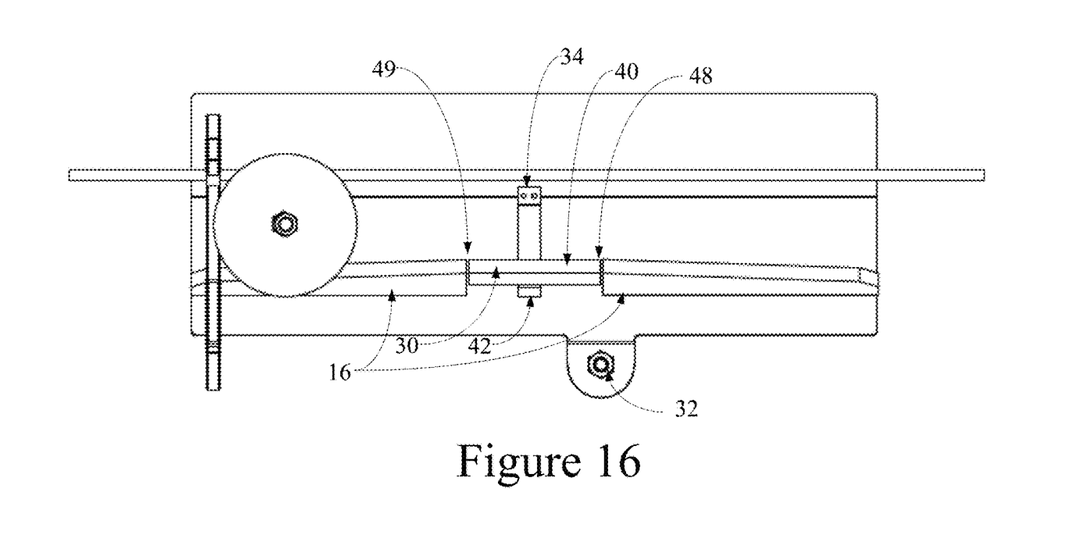
FIG. 16 of the drawings is a side elevational view of the alternate embodiment of the irrigation system of the present disclosure.

In another configuration, shown in FIGS. 15 and 16, the movable arm 30 comprises a substantially planar member that has a contact surface that is generally parallel to the path of the cable thereacross, with a pivoting that is generally perpendicular to the contact surface and generally perpendicular to the path of the cable thereacross. The path forming member 16 includes a segment both before the first end of the contact surface and after the second end of the contact surface so as to provide a smooth transition to the basket hook and to minimize the transverse movement while the basket hook extends across the measuring portion of the contact surface.

In other configurations, other surfaces are contemplated for the movable arm and the contact surface. Generally, the movable arm is displaced or impacted in a direction that is generally transverse (or includes a component that is transverse) to the path of the cable extending through the frame and the across the measuring assembly. Additionally, it will be understood that the movable arm is positioned so as to interfere with the path of the basket hook so that the basket hook is displaced by the movable arm, and creates a force against the movable arm in a direction that is at least partially transverse to the path of the cable to which the basket hook is coupled.

The operation of the system will be discussed in association with the plant carousel system disclosed above, with the understanding that the operation of related configurations carry the same basic principles set forth above, and with the understanding that the disclosure is not limited to any particular configuration of the components, and any particular configuration of the hanging plant carousel system.

Initially, the irrigation system 10 is coupled to a hanging plant carousel system. In particular, the frame 12 is positioned in a desired orientation relative to the hanging plant carousel system. In particular, the position of the frame is such that the contact surface 40 extends into the path of the basket hook 108 on the cable 106. In the configuration shown, the contact surface 40 is angled upward so that the hook (when displaced by the contact surface) is generally rides along the contact surface, maintaining contact with substantially the entirety of the contact surface, and so as to distribute the force of the basket hook along the contact surface. Additionally, it will be understood that the controller 36 is coupled to the controllers of the hanging plant carousel system.

Figure 12A:
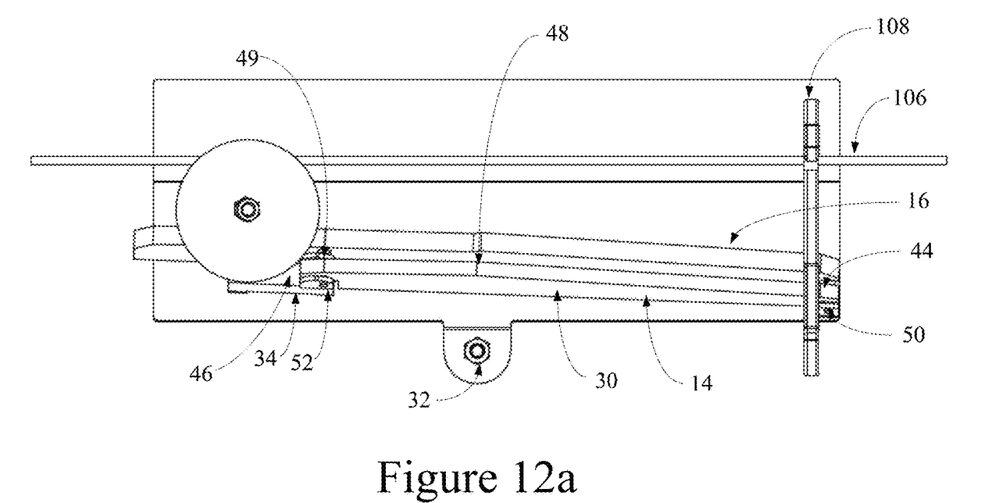
FIG. 12a of the drawings is a side elevational view of the irrigation system of the present disclosure, showing the entry of a basket hook into the system at the first end of the frame.
Figure 12B:
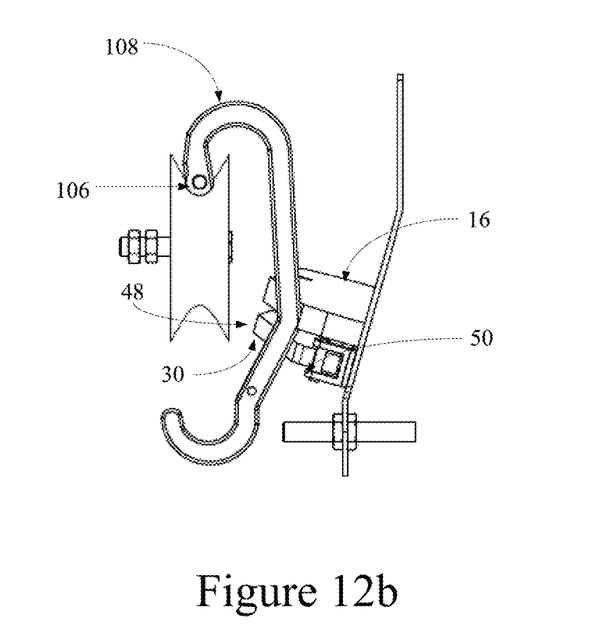

The hanging plant carousel system is activated, once the irrigation system is properly installed. As the system rotates, the cable and the basket hooks begin to move. The sequence of movements is shown with reference to FIGS. 12*a*/12*b* through 14*a*/14*b*. With reference to FIGS. 12*a* and 12*b*, eventually, a basket hook enters into the irrigation system 10. Continued movement of the cable eventually directs the basket hook into contact with the path forming member 16. The basket hook is rotated (about an axis defined by the cable) due to the contact with the path forming member. It will be understood that due to the configuration of the basket hook and the plant pot structure, the basket hook exerts a force against the path forming member in an effort to return to its original configuration.

Figure 13A:
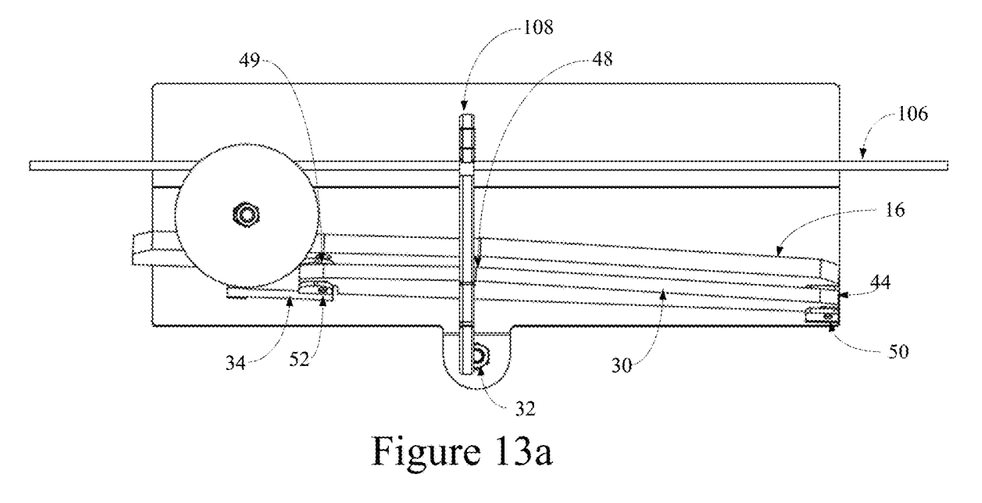
FIG. 13a of the drawings is a side elevational view of the irrigation system of the present disclosure, showing the passage of the basket just as the basket hook is associated with the measuring start point.
Figure 13B:
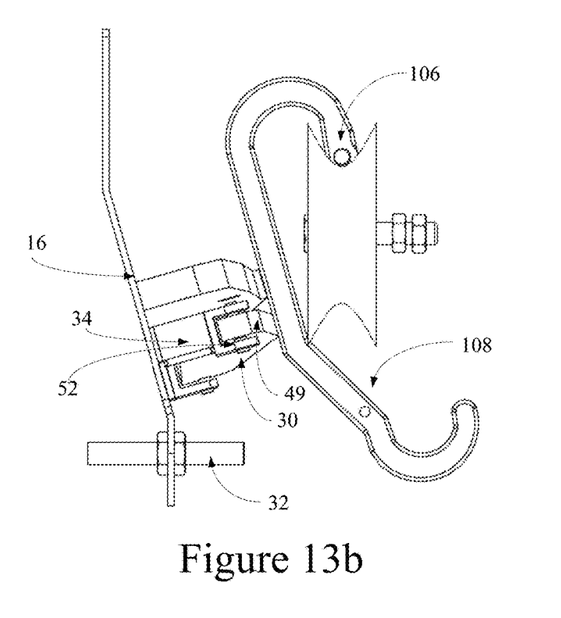

Eventually, and with reference to FIGS. 13*a* and 13*b*, the basket hook reaches the measuring start point 48 of the movable arm and the force is transferred from the path forming member to the movable arm. The log trigger sensor 32 receives a signal that a basket hook has crossed through the path of the sensor. The log trigger sensor is activated for the duration of the traversal, and can therefore sense the relative width of the basket hook (as well as the hook portion of the plant pot structure 200). By determining the width, the system can determine whether the plant pot structure is an upper plant (generally wider hook portion), or a lower plant (which requires a relatively narrow adapter 110).

Figure 14A:
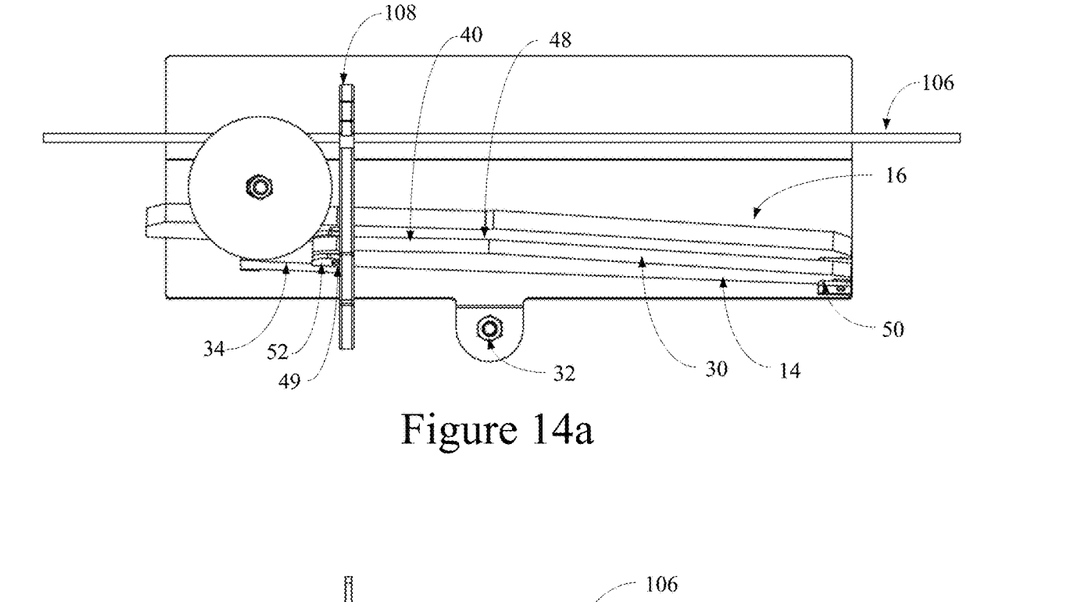
FIG. 14a of the drawings is a side elevational view of the irrigation system of the present disclosure, showing the passage of the basket hook just as the basket hook is associated with the measuring end point.
Figure 14B:
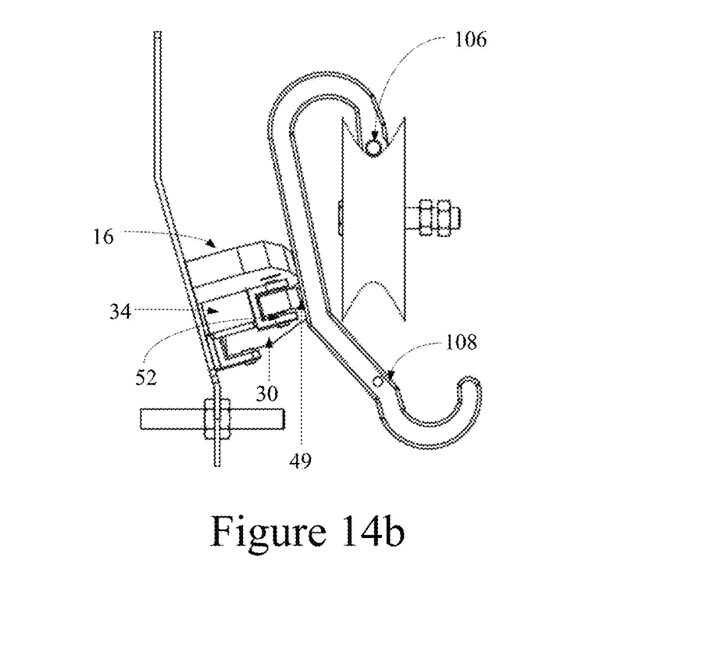

Once the start point is reached, and the basket hook passes, the reading of the measuring sensor return to registering a dramatic change in readings, signaling that the basket is on the contact surface between the measuring start point and the measuring end point. With reference to FIGS. 14*a* and 14*b*, once the end point is reached, and the basket hook passes back to the path forming member, the reading of the measuring sensor return to registering a dramatic change in readings, signaling that the basket hook is no longer on the contact surface between the measuring start point and the measuring end point. In the configuration shown, the force exerted by the basket hook (which is based upon the weight of the plant pot structure 200, at least in part) is directed to the movable arm, and rotates the movable arm about the pivot axis 50. The measuring sensor can capture data pertaining to the exerted force (through displacement, strain, or other movement). In other configurations, the log trigger sensor activates the sampling and storing of readings from the measuring sensor.

Based on the data that is gathered from the measuring sensor, the controller can determine the weight of the plant pot structure 200 (or a component thereof). By sampling along an extended path along the contact surface between the measuring start point and the measuring end point, and at a predetermined rate, a number of readings can be obtained. From these number of readings, the weight of the plant pot structure can be determined with increased accuracy. It has been found, for example, that in prototype configurations, the weight of the plant pot structure having a weight between eight and fifteen pounds could be determined within a quarter of a pound.

Based upon the calculated weight, the controller 36 can direct (or provide information to) controllers 134 or 139 to actuate the respective nozzle for a predetermined period of time when the plant pot structure that was weighed reaches the respective nozzle. The system is also provided with a desired weight for each of the plant pot structures. The system is provided with, for example, data pertaining to the watering system, such as flow rates and the like. With such information, the appropriate time the watering system should be active for each weighed plant pot structure can be determined and applied. That is, by comparing desired weight with measured weight, the amount of watering that is necessary can be determined within relatively close tolerances.

Additionally, it will be understood that the controller 36 can direct (or provide information to) controller 120 so as to slow down or speed up the motor in an effort to coordinate the speed of the plant pot structure as the plant pot structure traverses the watering system. For example, the motor may be slowed down to increase the time that a plant pot structure is in range of a respective nozzle. It will be understood that due to the configuration and measuring by the measuring sensor as the basket hook traverses the contact surface, stopping the motor is not necessary in order to obtain a weight sufficient to determine a watering schedule within sufficient tolerances.

It will be understood that as a weight can be determined for each plant pot structure (as opposed to merely understanding whether or not a plant pot structure is above or below a certain weight), the precise quantity of water that is to be added (if any) can be determined on a plant by plant basis, so as to bring the plant to the desired weight. It is known that prior art systems, either require the stoppage and individual weighing of each plant, or provide only sufficient information to know whether or not to water a plant (without knowing precisely how much to water a plant). It will be understood that each time a particular plant pot structure 200 passes through the irrigation system, the amount of water necessary for that particular plant pot structure is determined and then the system is directed to provide the particular amount of water.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method of irrigating a hanging plant on a hanging plant carousel system comprising:
   directing one of a basket hook suspended from the hanging plant carousel system and a plant pot structure hanging therefrom into contact with a movable arm, the movable arm having a contact surface with a measuring start point and a measuring end point;
   displacing the movable arm by the basket hook and the plant pot structure;
   measuring, while the basket hook is suspended from the hanging plant carousel system and pressed against the movable arm, the displacement of the movable arm repeatedly between the measuring start point and the measuring end point on the hanging plant carousel system, the measuring starting point and the measuring end point being different points on the movable arm;
   computing a weight of the plant pot structure based upon the measured displacement;
   determining a quantity of water that is necessary for the plant pot structure based on the computed weight of the plant pot structure; and
   providing the determined quantity of water for the plant pot structure.

2. The method of claim 1 wherein the measuring the displacement of the movable arm further comprises:
measuring the displacement of the movable arm repeatedly at a predetermined rate between the measuring start point and the measuring end point.

3. The method of claim 2 wherein the measuring comprises one of a load cell, a strain gauge or a linear variable differential transformer.

4. The method of claim 2 wherein the predetermined rate is multiple times per second.

5. The method of claim 4 wherein the predetermined rate is 10 Hz.

6. The method of claim 1 further comprising:
altering a speed of the hanging plant carousel system at least one of prior to, during and after the providing the quantity of water.

7. The method of claim 1 wherein the hanging plant carousel system further includes a plurality of spaced apart basket hooks with a plurality of plant pot structures hanging therefrom, the method further comprising:
repeating the directing, displacing, measuring, computing, determining and providing sequentially for at least one of the plurality of plant pot structures hanging from the plurality of spaced apart basket hooks.

8. The method of claim 7 wherein each of the plurality of plant pot structures further comprise one of an upper plant pot structure and a lower plant pot structure, the method further comprising:
determining whether each one of the plurality of plant pot structures comprises the upper plant pot structure or the lower plant pot structure;
and wherein the providing further comprises:
providing the quantity of water determined in the determining to a lower watering system if it is determined that one of the plurality of the plant pot structures is a lower plant pot structure; and
providing the quantity of water determined in the determining to an upper watering system if it is determined that one of the plurality of the plant pot structures is an upper plant pot structure.

9. The method of claim 1 wherein the movable arm is structurally configured to pivot about an axis, the displacing further comprising rotating the movable arm about the axis.

10. The method of claim 1 wherein the movable arm is structurally configured to move linearly, the displacing further comprising linearly displacing the movable arm.

* * * * *